May 23, 1967  M. E. DREIER  3,321,252
DISTRIBUTOR SPOUT FOR SILAGE
Filed Oct. 7, 1965
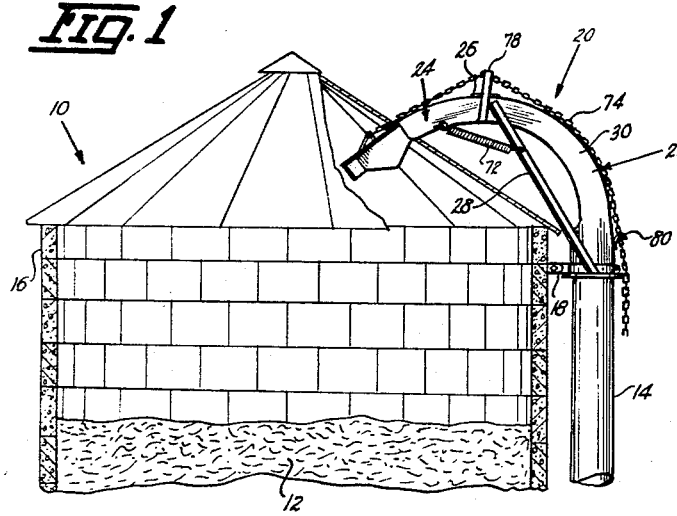
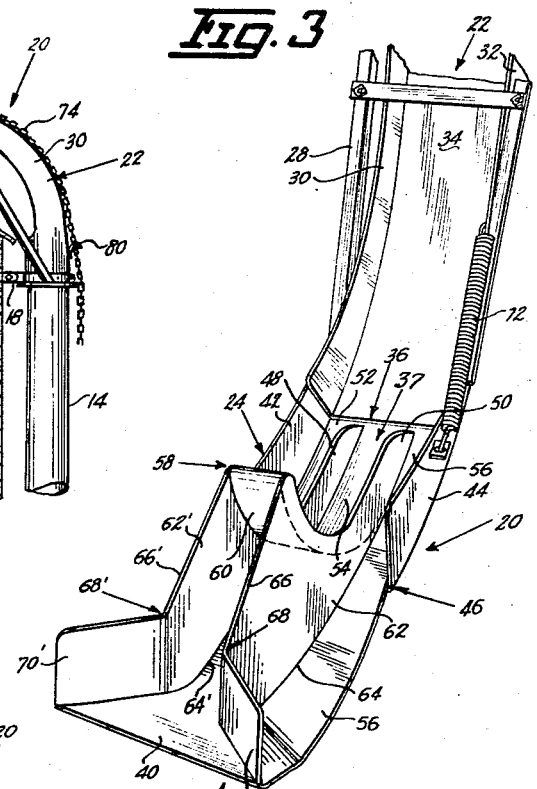
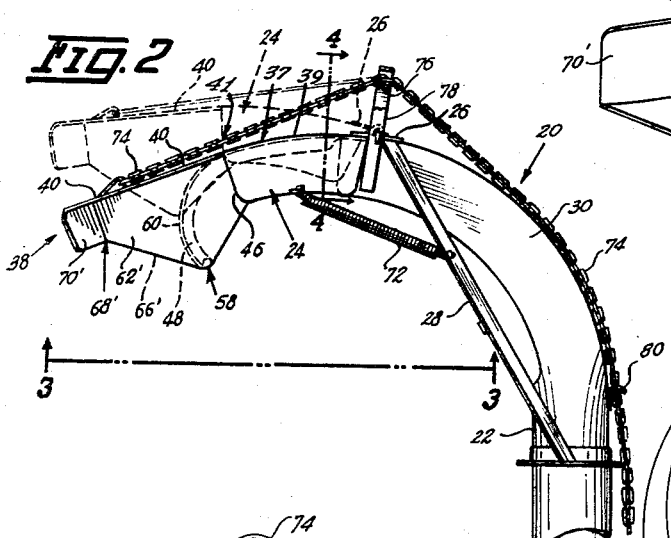
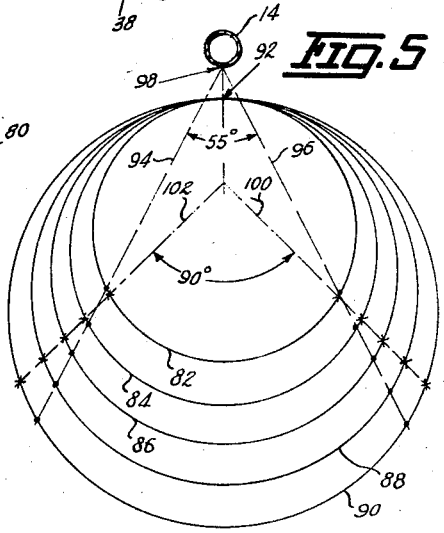
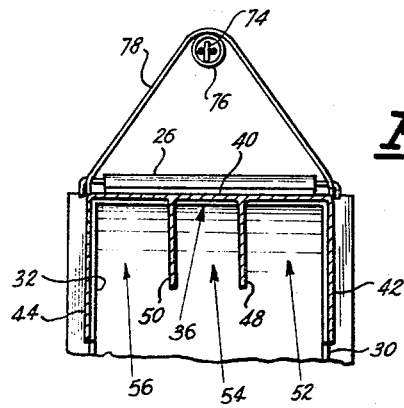
INVENTOR.
MELVIN E. DREIER
BY *Morton S. Adler*
ATTORNEY

3,321,252
DISTRIBUTOR SPOUT FOR SILAGE
Melvin E. Dreier, Dumont, Iowa 50625
Filed Oct. 5, 1965, Ser. No. 493,659
5 Claims. (Cl. 302—60)

This invention relates to improvements in distributor spouts through which silage and the like is moved for storage in silos.

It is well known in filling a silo with silage that the more evenly and uniformly the silage is distributed about the silo, the more palatable is the silage after fermentation. Without uniform distribution, the silage becomes segregated, air pockets develop and a hard core of material frequently forms that adversely affects not only the fermentation process but the actual balance of the filled silo so that the silo may be subject to tilting and even tipping over.

Various means and devices have heretofore been devised to effect the even distribution of silage being blown into a silo but these generally include auxiliary attachments such as deflector plates and other mechanism requiring maintenance and repair, are relatively expensive and usually have limitations relative to fixed silo sizes. Accordingly, one of the important objects contemplated by this invention is the provision of an improved distributor spout that is mountable in the same relative position on silos of different diameters and which will effect an even and uniform distribution of silage into the silo without the aid of auxiliary attachments.

More particularly this new distributor spout includes new design features utilizing a plurality of silage flow channels with each channel adapted to direct silage to a different point on the interior wall of the silo. In this regard, this new spout is designed to direct the silage in substantially uniform amounts to three substantially equally spaced points within the silo.

Another object herein is to provide a distributor spout as characterized which can be quickly and easily moved from one sile to another and which, for all practical purposes, is free of any requirement for maintenance and repair.

Further objects of this invention contemplate a distributor spout of the above class which is simple and easy to use; is economical to manufacture, durable in construction, and extremely efficient for its intended use.

To attain these objects and such further objects as may appear herein, or be hereinafter pointed out, reference is made to the accompanying drawings forming a part hereof, in which:

FIG. 1 is a fragmentary elevational view of the upper portion of a silo showing my new distributor spout positioned for use in directing silage to the interior thereof, FIG. 2 is an enlarged elevational view of this new spout with an adjustable position therefor shown in broken lines, FIG. 3 is a further enlarged view of this spout taken from the line 3—3 of FIG. 2 to more clearly illustrate the construction thereof.

FIG. 4 is a cross sectional view taken on the line 4—4 of FIG. 2, and

FIG. 5 is a diagrammatic illustration of several different silo diameters with added data to show the silage distribution pattern as will become apparent in the description which follows.

Referring now to the drawings, the upper portion of a silo is designated generally by the numeral 10 and is shown partially filled with silage 12 for illustration. As seen in FIG. 1, a vertically disposed fill pipe 14 extends while pipe 14 as shown is generally parallel to the silo wall 16 where it is secured thereto by a bracket 18 and such other lower similar brackets (not shown) as may be required. No invenion is claimed in any of the parts so far described as they are well known and it will be understood that the lower end of pipe 14 will be operatively associated with a source of silage supply and a blower means (not shown) whereby the silage is blown upwardly through pipe 14. In this regard, it is pointed out that while pipe 14 as shown is generaly parallel to the silo wall 16, there are frequently situations where the lower end of such pipe cannot be conveniently or practically located immediately adjacent the silo due to ground conditions or otherwise and must be located several feet away. In such circumstances, pipe 14 will extend from its base on an angle or a diagonal to the top of the silo so that the direction of discharge of silage from the top of pipe 14 is somewhat different than when such pipe is vertical. The present invention, designated generally by the numeral 20, is designed for attachment to the upper end of pipe 14 to evenly and uniformly distribute the silage 12 within the interior of silo 10 and for such purpose to be adjustable relative to the direction of discharge of the silage from the top of pipe 14 in order to accomplish the desired distribution pattern as will appear.

Spout 20 may be described as a gooseneck in overall appearance and comprises the fixed base 22 and the adjustable distributor spout end 24. End 24 is hingedly connected 26 to the base 22 at a point representing the approximate top of the curve of the overall gooseneck shape of spout 20 as best seen in FIGS. 1 and 2. The lower end of base 22 is adapted to be connected to the upper end of pipe 14 in any suitable manner, and a brace member 28 extends from one side of the lower end of base 22 to the upper extremity of the base on the same side and to a point adjacent the area of hinge 26. Base 22, exclusive of hinge 26, as thus far described, is not dissimilar from that portion of distributor spouts attached to fill pipes in other devices and such base may be either a closed conduit or of inverted channel shape having the depending flanges 30 and 31 and the closed top 34 as preferably shown here, it being pointed out that in the description of flanges 30 and 32 and the top 34 this spout 20 is shown in operable position in FIGS. 1 and 2 and is inverted in FIG. 3 for purposes of better illustration. However, the more important novel feature of this invention resides in the distributor spout end 24 which I shall now describe.

For purposes of description, the distributor spout end 24 is further defined by the receiving end 36 and the discharge end 38 as clearly seen in FIG. 3. Spout end 24 includes a top designated generally by the numeral 37 and which includes the integral portions 39 and 40. Portion 39 of top 37 is arcuate so that it complements top 34 of the base 22 in the overall gooseneck design referred to and is attached by hinge 26 at the receiving end 36 to the projected end of base 22 as shown. Portion 40 of top 37 is straight or planar from approximately point 41. The arcuate portion 39 of top 37 outwardly from base 22 and relative to the hinge point 26 is flanked by the depending flanges 42 and 44 which in effect are continuations of the respective flanges 30 and 32 on top 34, and from the outward extremity of flanges 42 and 44 designated by the numeral 46, to portion 40 becomes progressively wider to the discharge end 38. Intermediate flanges 42 and 44 there is secured to top 37 the spaced parallel depending partitions 48 and 50 which are of lesser depth than flanges 42 and 44 and are tapered near end 36 to the plane of top 34 as best seen in FIG. 3. These partitions 48 and 50 effectively divide spout end 24 into three parallel silage flow channels including the outer channels 52 and 56 and the center channel 54 which as shown, can be seen to be in communication with base 22 for intercepting silage blown through base 22. Partitions 48 and 50 extend from the receiving end 36 first parallel with top 37 to approximately point 46 and then curve downwardly and slightly backwardly to their outer ends 58 which are positioned towards base 22 as seen in FIG. 2. The intermediate area between the curved portions of partitions 48 and 50 is closed by the arcuate plate 60 which merges with top 37 so that channel 54 is of an inverted channel shape designed to intercept a portion of the flow of silage and to discharge it into the silo 10 toward the wall surface adjacent the fill pipe 14. It will also be seen at this point that the initial portions of channels 52 and 56 outwardly from the hinge point 26 are also of an inverted channel shape with channel 56 (FIG. 3) being thus formed by top 37, partition 50 and flange 44 and channel 52 being similarly formed by top 37, partition 48 and flange 42 so that silage is actually intercepted and divided into three channels 52, 54 and 56 as it leaves the base section 22.

As best seen in FIG. 3, channel 56 has no outer sidewall or flange beyond point 46 and is progressively wider to the discharge end 38. The inner side of channel 56 is defined by the sidewall 62 which is an extension from the curved portion of partition 50. Wall 62 has an upper edge 64 abutting top portion 40 and a lower edge 66 extending from end 58 upwardly and outwardly at angle within a 30°–40° range to form a deflector 70 that terminates at the outermost outside edge of channel 56. Channel 52 is similarly formed and like numerals primed are used for like parts. In the description here of an upper edge 64 and lower edge 66 as relates to FIG. 3, it should be remembered that the illustration in FIG. 3 is inverted relative to its operating position.

The entire unit 24 is normally yieldingly held in the position shown in FIG. 2 by a spring 72 connected between flanges 32 and 44, but is movable upwardly on hinge 26 to change the trajectory of the silage relative to the angle of discharge of silage from the top of pipe 14. For this purpose, a chain 74 extends from the outer side of top 40 near the discharge end 38 through a guide loop 76 secured to the top central portion of a bail 78 that is secured to base 22 over the hinge point 26. Chain 74 is trained over base 22 and may extend to ground level where it can be manually manipulated for adjusting spout end 24 as desired and is illustrated in the broken lines of FIG. 2. In this regard, it will be understood that any suitable cord or cable may be used in place of chain 74. Chain 74 will be secured in suitable manner in any adjustable position as illustrated by the hook 80 on base 22 for engaging selected links in the chain.

*Operation*

In describing the operation of spout 20 and particularly spout end 24, reference is made to the diagram in FIG. 5 showing representations of varying silo diameters such as for 12, 14, 16, 18 and 20 feet respectively and represented by the respective numerals 82, 84, 86, 88 and 90. The position of the fill pipe 14 is shown in relation to the common point 92 of the various size silos with which it may be used and the 55° angle lines 94 and 96 having the apex 98 adjacent pipe 14 are projected to intersect the several silo lines to illustrate that the respective points of intersection together with point 92 divided each silo circumference into approximately three equal parts. Accordingly, one of the important objects of spout end 24 is to divide the silo into three substantially equal flow volumes, which is accomplished by channels 52, 54 and 56 and to direct such silage to three respective points within the silo that are substantially equidistant from each other. For this purpose, the discharge end 38 as seen in the solid lines of FIG. 2 is positioned approximately three and one half feet from point 92 to the center of any silo on which this device is used. The angle on deflectors 70 and 70' previously described discharges the silage in respective directions from channels 52 and 56 in the directions indicated in FIG. 5 by the 90° lines 100 and 102, and it will be seen that when lines 100 and 102 are projected, they substantially coincide with the respective points of intersection lines 96 and 94 on the several silo circumferences. Thus, with silage discharged from channel 56 toward point 92, it will be appreciated that the silage 12 is evenly and uniformly distributed within the silo. Spout 20 is positioned as described relative to any size silo and depending upon the vertical or angular position of pipe 14, the trajectory of the silage can easily be adjusted by chain 74 to direct the silage to three substantially equidistant points within the silo.

It is pointed out that except for the movement afforded by hinge 26, all the parts of spout end 24 are fixed, and spout end 24 itself remains fixed in operation, so that for all practical purposes, maintenance and repair is eliminated. In actual field tests, this distributor spout has proved to be most efficient and convenient. It is relatively light and can be easily moved from one silo to another. Accordingly, from the foregoing, it is thought a full understanding of the construction and operation of this invention will be had and that the advantages of the same will be appreciated.

It will be understood that the phraseology employed herein is for the purpose of description and not for limitation and that modifications and changes can be made within the scope of what is claimed, without departing from the spirit and purpose thereof.

I claim:
1. A distributor spout for use in directing material such as silage or the like into a storage container, comprising:
   a gooseneck shaped conduit having
      a base section for attachment to material moving apparatus and exteriorly of said container, and
      a distributor spout adapted to extend over the top of a container to be filled and having a discharge end oriented relative to the interior of the container,
   a pair of spaced parallel partitions within said distributor spout to divide it into thre parallel material flow channels for intercepting material moving through said base section,
   an arcuate plate defining the end of said center channel at a point inwardly from said discharge end so as to direct material in said center channel downwardly into the container in a direction toward a selected point at the perimeter of said container,
   respective deflector members in said outer channels at said discharge end for respectively directing material toward different spaced points within said container so that the target points of said channels are substantially equidistant on the perimeter of said container and equidistant from each other.
2. A spout as defined in claim 1 wherein:
   the direction of discharge of material from said center channel is reversed relative to its direction of movement from said base section, and
   the directions of discharge from said outer channels are away from each other and at selected angles from the direction of discharge of material in said center channel so that material is discharged into said container at three substantially equidistant points about the perimeter thereof.

3. A spout as defined in claim 1 wherein:
said distributor spout includes a receiving end hingedly attached to said base section, and
control means for moving said distributor spout on said hinge for selectively regulating the trajectory of material moving therethrough.

4. A spout as defined in claim 1 wherein the position of the discharge end of said conduit is fixed at approximately three and one half feet from the wall of said container irrespective of the size of said container.

5. A distributor spout as defined in claim 3 wherein:
said spout is moved only for adjustment as required by the position of said material moving apparatus relative to said container, and
said distributor spout remains in a fixed position while silage is passing therethrough into said container.

References Cited by the Examiner
UNITED STATES PATENTS 2,257,572  9/1941  Radue _____ 302—60
2,650,136  8/1953  Raleigh _____ 302—60

ANDRES H. NIELSEN, *Primary Examiner.*